May 2, 1933. H. J. ERNST 1,907,099
SWIVEL JOINT FOR FLUID PIPES
Filed Jan. 27, 1931  2 Sheets-Sheet 2
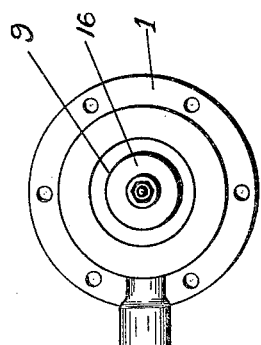
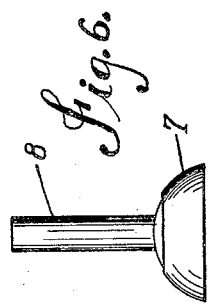
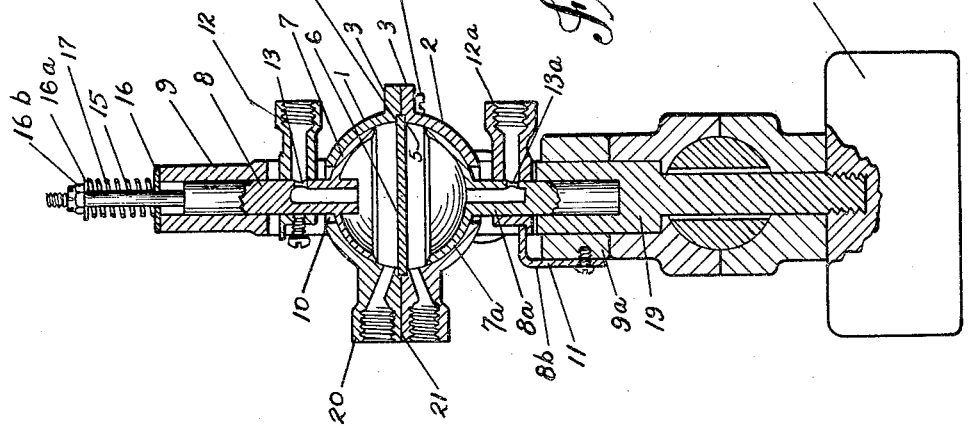
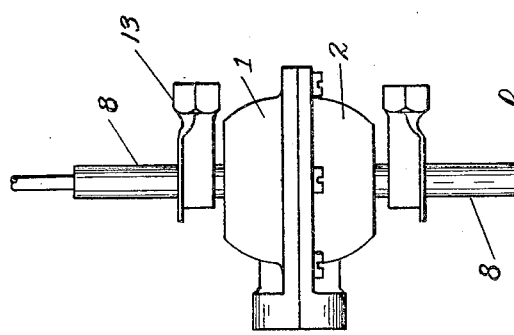
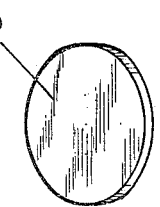
INVENTOR.
Henry J. Ernst
BY
ATTORNEYS Patented May 2, 1933

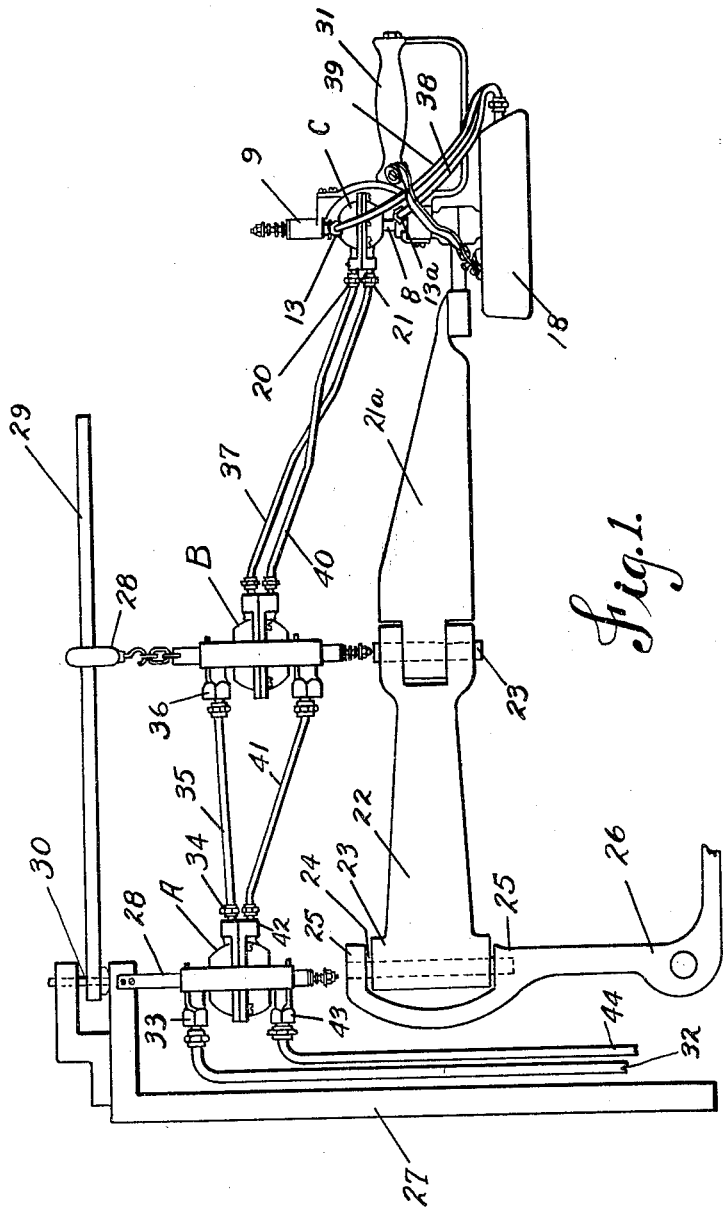

1,907,099

UNITED STATES PATENT OFFICE

HENRY J. ERNST, OF NEWPORT, KENTUCKY

SWIVEL JOINT FOR FLUID PIPES

Application filed January 27, 1931. Serial No. 511,572.

My invention relates to swivel joints for fluid pipes, and particularly to a novel arrangement of fluid joints for controlling the flow of steam to and from a steam heated pressing iron.

It is an object of my invention to provide swivel joints for the steam control pipes heating a steam pressing iron which will permit easy movement of the iron without a tendency to bind because of the swivel connection.

Another object of my invention is to provide a swivel joint with the steam inlet and outlet pipes so arranged that condensation will be readily moved through the apparatus without tending to build up at any particular point.

Another object of my invention is to provide a ball socket joint which provides a double steam chamber, one of which is for the inflowing heated vapor, and the other of which is for the outflowing vapor or fluid.

Another object of my invention is to provide in combination with a steam pressing iron for a series of ball socket joints to be so arranged with piping that a maximum of heating value is provided for the iron.

The above objects and other objects to which reference will be made in the ensuing disclosure, I accomplish by that certain combination and arrangement of parts of which I have illustrated a preferred embodiment.

Referring to the drawings:—

Figure 1 is a side elevation of a preferred type of arrangement for a steam iron.

Figure 2 is a side elevation of the preferred type of swivel joint.

Figure 3 is a sectional view of the preferred mounting of the steam iron.

Figure 4 is a plan view of the swivel joint shown in Figure 2.

Figure 5 is a perspective view of the disc which divides the interior of the swivel joint into two steam compartments.

Figure 6 is a side elevation of one of the semi-spherical members of the joint.

Referring first to Figure 3, it will be noted that my new type of swivel joint comprises a sectional casing having an upper semi-spherical member 1, and a lower semi-spherical member 2, the casing being flanged, as indicated at 3, and the portions 1 and 2 being bolted together as by means of screws 4.

The casing segments 1 and 2 have annular bored-out recesses 5, within which is seated a disc 6, which separates the chamber into two distinct compartments.

Within the semi-spherical chambers 1 and 2, I have shown semi-spherical members 7, having stems 8, these stems having short passageways therein.

The casing segments have tubular extensions 9, 9a extending from the openings 10. Extending out laterally from the extensions there are branch pipes 12, 12a, having ports 13, 13a, extending into the passageways in stems 8. Screws 14 may be used to hold the branch pipes in position.

Secured to the end of the stem 8, there is a stud 15. The stud has a washer 16 at the bottom resting on the end of the extension 9, and another washer 16a held adjustably by a nut 16b. Between the washers there is a spring 17. By tightening down on the nut when the steam pressure is low, the frictional bearing of the members 7 and 7a against their spherical seats can be increased.

The steam iron is indicated at 18, having a bolt 19 through which the iron is mounted on the ball socket joint. A semi-spherical member 7a, having a tubular extension 8a, is movable within the semi-spherical surface of the casing 2. A coupling member 12a is secured adjacent the port 13a which extends out from the side of the passage, so that any pressure from within the casing 2 would escape through the passage in the stem 8a, and out through the coupling member 13a. The stem 8a is held by means of a clamp 8b, which extends from the member 9a so that when the nut 16 is tightened down, the frictional bearing of both the members 7 and 7a is increased uniformly.

Mounted on the semi-spherical casing members 1 and 2, and preferably integrally formed therewith, are the internally threaded coupling members 20, 21.

When steam pressure is applied to one of the ports, the members 7, 7a are forced tightly against their seats, allowing no escape of steam or moisture. Referring now to the general assembly view shown in Figure 1, I have provided three sets of ball-socket fluid-flow control chambers illustrated at A, B and C. The iron 18 is supported on a horizontally pivoted link 21ª, which is pivoted to a link 22 at 23ª. The link 22 has a boss 23, through which a rod 24 extends which is journaled in bifurcated portions 25 of the bell crank 26. Rocking of the bell crank 26 moves the iron into and from contact with the work to be pressed.

A portion of the elevated frame, as indicated at 27, and straps 28 support the swivel joints. A lever 29, pivoted on the axis of the swivel A, as indicated at 30, permits the swivel joints to be moved so that the movement of the iron 18, by means of the handle 31, will not cause the pipe connections to bind.

Inlet steam for the iron passes through a pipe 32, thence through coupling piece 33, and into the opening in the top of the tubular member forming part of the ball socket joint A. The steam passes out of the coupling 34 through the pipe 35, into the coupling piece 36, and down through the tubular member within the ball socket joint B. From the socket joint B steam passes through the pipe 37, and through the coupling piece 21, into the chamber in the lower compartment in the joint C. From within the chamber in the lower compartment of the joint C steam passes down through the stem 8ª, and from the stem out through coupling piece 13a. A flexible tube 38 is connected to the coupling piece 13a, and through this conduit steam is supplied to the iron. The exhaust from the iron passes through the flexible tube 39, into the coupling piece 13, and from this passage the steam passes down into the upper part of the joint C. Draining out through the coupling 20 in the upper compartment of the socket C, the exhaust passes through the pipe 40, into the port in the lower compartment in the socket B. Draining out of the bottom of the compartment through the passage through the tubular stem the exhaust passes through the pipe 41 into the coupling 42 of the lower compartment of the socket A. The exhaust then passes out through the coupling piece 43 and the pipe 44.

The particular advantage of my construction, in addition to the novel ball socket joint which I have provided, is that the flow of the exhaust from the steam heated iron is such that it will not be trapped in any position within the socket joints.

It is a particular feature of my ball socket joint that the upper and lower semi-spherical washer members which seat with pressure against the curved walls of the chamber, have walls which conform to the true radii of a circle. Whatever degree of inclination the stems 8 have from actual alignment in no way prevents them from having free rotary movement.

The use of the three steam tight double compartment ball and socket joints which I have provided allows freedom of movement for the links 21 and 22ª, and at the same time permits the iron 18 to be rocked by means of the handle 31, so that if it is desired to exert more pressure on the tip of the iron, or on the back end, this may be readily accomplished.

While I have shown my double compartment ball and socket joint in combination with a steam pressing iron, it is obvious that many other uses for such a joint will occur for different purposes. Further, the conducting of the steam fluid through the pipes in the arrangement shown in Figure 1, by which trapping of exhaust moisture is prevented, may be employed in other combinations.

Having thus described my invention, what I claim as new and desire to secure by Letters Patent, is:—

1. A ball socket joint comprising two semi-spherical casing members coupled together, forming a spherical casing, with a solid disc held between said members separating the joint into two compartments.

2. A ball socket joint comprising two semi-spherical casing members coupled together, forming a spherical casing, with a solid disc held between said members separating the joint into two compartments, said casing members having relatively fixed side couplings and tubular coupling members mounted for swiveling movement in concentric radii.

3. A ball socket joint for permitting swiveling movement of fluid supply and exhaust pipes comprising a spherical casing composed of upper and lower semi-spherical casing members coupled together, and retaining a division wall between the members separating the two members into separate semi-spherical compartments.

4. A ball socket joint for permitting swiveling movement of fluid supply and exhaust pipes comprising a spherical casing composed of upper and lower semi-spherical casing members coupled together, and retaining a division wall between the members separating the two members into compartments, coupling members so connected to said joint that the flow of fluid follows a gravity flow path through the compartments in said joint.

5. A ball socket joint for permitting swiveling movement of fluid supply and exhaust pipes comprising a spherical casing composed of upper and lower semi-spherical casing members coupled together, and retaining a division wall between the members separating the two members into compartments, coupling members so connected to said joint that the flow of fluid follows a gravity flow path through the compartments in said joint, an inlet supply passing in the top and out the bottom of the upper compartment, and the exhaust passing in the top and out the bottom of said lower compartment.

6. A ball socket joint for permitting swiveling movement of fluid supply and exhaust pipes comprising a spherical casing composed of upper and lower semi-spherical casing members coupled together, and retaining a division wall between the members separating the two members into compartments, and means for adjusting the tension of said joint for varying conditions of fluid pressure.

7. A ball socket joint for permitting swiveling movement of fluid supply and exhaust pipes comprising a spherical casing composed of upper and lower semi-spherical casing members coupled together, and retaining a division wall between the members separating the two members into compartments, and means for adjusting the tension of said joint for varying conditions of fluid pressure, said means comprising a single adjustment device.

8. A ball socket joint having independent semi-spherical compartments, with coupling members swiveled for movement within said compartments along radii extended from the same center, and means for adjusting the tension of said joint for varying conditions of pressure, said means comprising an adjustable spring.

9. A ball socket joint comprising two semi-spherical casing members coupled together, forming a spherical casing, with a solid disc held between said members separating the joint into two compartments, and means for adjusting the tension of said joint for varying conditions of pressure, said means comprising an adjustable spring.

HENRY J. ERNST.